United States Patent
Ross et al.

(10) Patent No.: US 7,580,701 B2
(45) Date of Patent: Aug. 25, 2009

(54) DYNAMIC PASSING OF WIRELESS CONFIGURATION PARAMETERS

(75) Inventors: Alan D. Ross, Shingle Springs, CA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 11/320,142

(22) Filed: Dec. 27, 2005

(65) Prior Publication Data

US 2007/0147318 A1 Jun. 28, 2007

(51) Int. Cl.
*H04M 11/00* (2006.01)
(52) U.S. Cl. ............... 455/411; 455/410; 455/435.1; 455/435.2; 455/435.3
(58) Field of Classification Search ............... 455/410, 455/411, 435, 435.1, 435.2, 435.3
See application file for complete search history.

(56) References Cited

U.S. PATENT DOCUMENTS

2004/0236851 A1* 11/2004 Kuan et al. ............... 709/224
2005/0210299 A1* 9/2005 Mehta et al. .............. 713/300
2005/0246768 A1* 11/2005 Hunt et al. ................ 726/11
2006/0039340 A1* 2/2006 Ptasinski et al. ........... 370/338
2006/0203815 A1* 9/2006 Couillard .................. 370/389

OTHER PUBLICATIONS

B. Aboba et al., "RFC 3748—Extensible Authentication Protocol (EAP)", Jun. 2004, 65 pages, The Internet Society, www.rfc-archive.org.
C. Rigney et al., "RFC 2865—Remote Authentication Dial in User Service (RADIUS)", Jun. 2000, 73 pages, The Internet Society, www.rfc-archive.org.
N. Cam-Winget et al., "EAP Flexible Authentication Via Secure Tunneling (EAP-FAST) draft-cam-winget-eap-fast-02.txt", Apr. 25, 2005 (expires Oct. 25, 2005), 53 pages, The Internet Society.

* cited by examiner

*Primary Examiner*—Nick Corsaro
*Assistant Examiner*—Vladimir Magloire
(74) *Attorney, Agent, or Firm*—Blakely, Sokoloff, Taylor & Zafman LLP

(57) ABSTRACT

Methods and apparatuses allow for wireless configuration parameters to be passed to a client to enable the client to configure a wireless network interface to connect to a wireless network.

17 Claims, 7 Drawing Sheets

DYNAMIC PASSING OF WIRELESS CONFIGURATION PARAMETERS

FIELD

Embodiments of the invention relate to wireless networking, and more specifically, to obtaining access configuration parameters for connecting to a wireless network.

BACKGROUND

Traditionally, a user manually scans for wireless networks (e.g., a wireless local area network (WLAN)) using client software and then determines the connection properties for networks that are discovered. Client software on a client device (e.g., a wireless-enabled computing device) may be configured to automatically scan for wireless networks. However, the software generally must be enabled by the user in order to automatically scan, and if wireless networks are found, the user traditionally must manually attempt to obtain access to a wireless network.

If a network is a closed network, referring to a network that does not broadcast an identifier and/or performs other operations to limit access. Traditionally a user must have prior knowledge of configuration parameters of a closed network to enable the user to obtain access to the network. When an access point broadcasts an identifier, for example, an SSID (service set identifier), a potential client can detect the SSID and determine configuration parameters necessary to connect to the access point in order to attempt to obtain access to the wireless network. Obtaining access generally includes authentication of the client. For a network that does not broadcast an SSID, the user must traditionally have prior knowledge of the environment or configuration parameters, or perform manual connection operations, or both.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
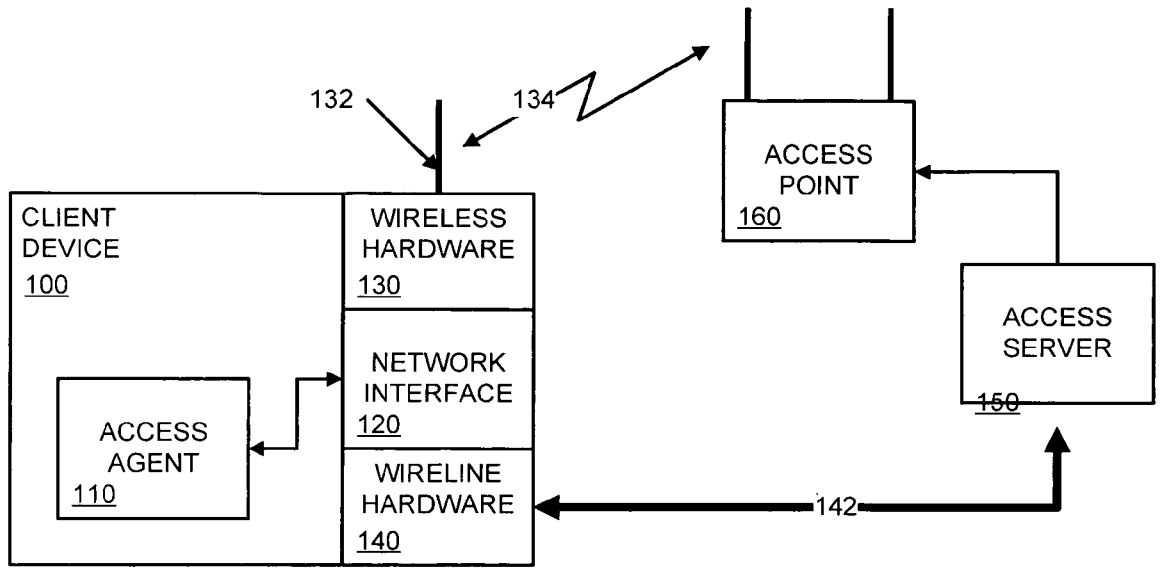
FIG. 1 is a block diagram of an embodiment of a client device with an access agent.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

A wireless network can be configured to allow passing configuration parameters to a client device to enable the client device to connect to a wireless network without the need for manual configuration or prior knowledge of the network environment. Authentication protocols can be used to provide functionality for passing the configuration parameters. For example, a client device may employ a protocol that is compatible with, or a variant of, the Extensible Authentication Protocol (EAP) to communicate with a wireless access point. EAP is described in Request for Comments (RFC) 3748—Extensible Authentication Protocol (EAP) of The Internet Society, published June 2004. The use of the term access point is not intended to be limiting, but is used as an example, and may refer herein to one or more switches, access points, etc., or some combination. The access point may employ a protocol that is compatible with, or a variant of, the RADIUS (remote authentication dial-in user server/service) standard to communicate with a decision point. RADIUS is described in the draft standard specification RFC 2865 Remote Authentication Dial In User Service (RADIUS) maintained by the Internet Engineering Task Force (IETF), published June 2000. The access point is a point of connection by a user to the wireless network, and the decision point refers to an entity that provides an access policy, determines whether a particular user authenticates correctly, etc. In one embodiment the access point and the policy decision point reside in a single piece of hardware.

In one embodiment the client device includes hardware and/or software to interact with the access point, receive configuration information, and implement configuration of the client's network interface hardware to provide automated wireless connectivity. For example, INTEL Corporation of Santa Clara, Calif. provides an ACTIVE MANAGEMENT TECHNOLOGY platform (iAMT) that could incorporate functionality to provide dynamic wireless connectivity. The hardware and/or software may include in-band firmware (e.g., software residing on a platform component that is accessible via the client device host operating system) and/or out-of-band (OOB) components (e.g., hardware and/or software inaccessible via the client host operating system).

In one embodiment a system providing automated wireless connectivity could be policy generated, allowing an owner/operator of the wireless network (e.g., a business enterprise network) to selectively disposition clients in the network. Thus, provisions could be made for client devices that fail authentication, fail to present credentials, etc. Additional data could also be included, such as proxy server information, etc. In one embodiment client software can be passed some or all of this information to allow it to be presented graphically to the user by the client software (e.g., PROSET available from INTEL). The graphical presentation can advise the client of current connectivity status and also provide a link to address problems (e.g., failed authentication). In one embodiment the system could also pass compliance data with the configuration parameters, or select configuration parameters specifically based on the extent to which a user authenticates. For example, a client that fails to present credentials could be extended a certain level of connectivity, a client that fails authentication could be directed to a compliance location in the network, etc. At least one mechanism that could be used to provide this functionality includes providing different SSID assignments to different clients. In one embodiment a network includes a quarantine VLAN, which could be accessed by a client from a particular quarantine SSID. Providing different connectivity points and different access can allow for a network service that reduces the risk of network compromise by a non-compliant machine, and which would allow a user to bring a client device into compliance with network access policy.

If EAP is used as the authentication protocol, implementations may vary on EAP type. For example, EAP-MD5 (EAP-message digest 5) can be implemented. Alternatively, EAP-TLS (EAP-transport layer security) can be implemented, where the authentication entity (e.g., in-band access agent, OOB hardware, etc.) has a full TLS stack available. Another alternative could be an implementation according to the EAP-FAST (EAP-Flexible Authentication via Secure Tunneling) sponsored by CISCO SYSTEMS, Inc., of San Jose, Calif. An EAP-FAST implementation is more amenable to an implementation by in-band firmware. The EAP-FAST proposed standard is described in the Internet-Draft EAP Flexible Authentication via Secure Tunneling (EAP-FAST), draft-cam-winget-eap-fast-02.txt, published April 2005 by The Internet Society, the draft expires October 2005. The use of EAP enables the client device to perform authentication at layer 2, and thus avoid security vulnerabilities of layer 3 protocols such as DHCP (Dynamic Host Configuration Protocol).

The automation of wireless configuration, and the tying of wireless configuration to authentication using EAP, client software can dynamically connect to the right access point as determined by the RADIUS server and communicated to the client software. The automation can thus reduce the risk of needing to engage in time consuming and error-prone manual activities in order to gain access to a wireless network that are traditionally required when a client device fails authentication or fails to receive an IP address due to incorrect encryption or 802.1x authentication configuration information. The inclusion of the wireless configuration information in the client access exchange and the passing of this configuration information directly to the wireless client, provide enhanced functionality to enable clients to be automatically connected to the appropriate access point and SSID using the right encryption.

FIG. 1 is a block diagram of an embodiment of a client device with an access agent communicatively coupled to an access server. Client device 100 represents an electronic device with wireless capability, and may be a laptop computer, a mobile device such as a cellular telephone or PDA (personal digital assistant), a desktop computing or workstation with wireless connectivity, etc. Client device includes access agent 110 to provide wireless connectivity functions to client device 100. Access agent 110 includes one or more components, functions, and/or software to provide dynamic wireless connectivity, as described above. In one embodiment access agent 110 includes client software to manage and/or interact with network interface hardware. The client software may provide a mechanism to implement configuration settings on the network interface hardware, and can allow a user to view the hardware and provide settings manually. Access agent 110 may also include OOB and/or in-band hardware and/or software to receive and send data related to securing access for client device 100 to a wireless network.

Access agent 110 may be coupled to network interface 120, which represents one or more elements of hardware and/or software to provide networking connectivity. In one embodiment access agent 110 may reside on network interface 120. Network interface 120 may include a computer card having ports and connectors to receive network cables or wireless communications and pass the information back to client device 100. Network interface 120 may include wireless hardware 130, including one or more antenna devices 132. Wireless hardware 130 includes the communication path, processors, radio circuits/modules, etc. Wireless hardware 130 enables client device 100 to transmit and receive wireless communication with another wireless entity, for example, access point 160.

Access point 160 can be as described above, and include a switch, router, or other wireless device that provides wireless communication to one or more clients. Access point 160 includes a wired connection to a communications back-end (e.g., broadband access connection, etc.) that enables the transfer of communication through access point 160. Access point 160 is coupled to access server 150, which represents one or more devices, including servers, workstations, switches, routers, etc., and/or combinations of these. Access point 160 could be the enforcement point of the system of FIG. 1, while access server 150 may be the decision point. The decision point may include configuration information, passwords, etc., to determine if client device 100 should be allowed access to a network managed by access server 150, or a network of which access server 150 is a part. The enforcement point can implement the decisions of the decision point, for example, by allowing or disallowing traffic to/from client device 100, depending on whether client device 100 was granted access to the network by access server 150.

Client device 100 may also include wireline hardware 140, which represents one or more circuits or components that provide one or more ports for receiving a network cable, or wired connection 142, over which client device 100 may be coupled to access server 150. Wired connection 142 is understood to include switches, repeaters, ports, jacks, etc., to couple client device 100 to access server 150. In one embodiment wireless hardware 130 and wireline hardware 140 are part of network interface 120. In one embodiment one or more components of wireless hardware 130 and/or wireline hardware 140 can exist separately from one or more circuits/components considered to be network interface 120.

Access agent 110 may attempt access to access server 150 over a wired or wireless connection. In one embodiment client device 100 is plugged into wired connection 142 through wireline hardware 140. This may allow access agent 110 to obtain wireless configuration information over wired connection 142. This could be initiated by an access request generated by access agent 110. For example, a visitor to an enterprise with a wireless network may first plug client device 100 into a wired network jack, enabling access agent 110 to connect client device 100 to the wireless network. In another embodiment access agent 110 transmits an access request over wireless connection 134. The initial connection to access point 160 over wireless connection 134 can be a request for wireless configuration information. In one embodiment access agent 110 generates the request according to standard or default configurations that access point 160 can be configured to understand, even if the wireless network is operating on different standards. In one embodiment access agent 110 generates a request with different combinations of configurations until a match is found with access point 160. The initial connection does not provide "network access" in terms of allowing the passage of data to and from client device 100. The initial connection allows the passage of configuration information to client device 100 to enable client device 100 to attempt to authenticate and gain access to the wireless network. Whereas the request message may be processed and forwarded by access point 160, data traffic to or from client device 100 may be completed restricted until authentication is completed.

In one embodiment access server 150 supports the dynamic creation of SSIDs. Thus, access server 150 may generate a new SSID for each client device 100 that connects to the wireless network. In this manner, the activity could be individually auditable for security purposes. Blocking access to client 100 for breach of security could be as simple as disabling the SSID for client 100. In one embodiment access server 150 may support a single-access password, which may expire after client 100 has used the password for a single session with access point 160. Thus, the password could enable client 100 to connect to access point 160 and obtain configuration data to allow continued connectivity, based on whether client 100 is able to meet a security policy for the network.

In one embodiment dynamic, transitive SSIDs are used by access point 160. In such an implementation, each time client device 100 connects to access point 160, access server 150 must supply the configuration information necessary to enable client 100 to access the wireless network. Passing wireless configuration to client 100 enables access point 150 to manage the network with dynamic, transitive SSIDs to reduce the risk that someone could hack the network and obtain configuration that would allow access to the network. Each time the SSID changed, the hacker's stolen configuration information could be outdated.

Figure 2:
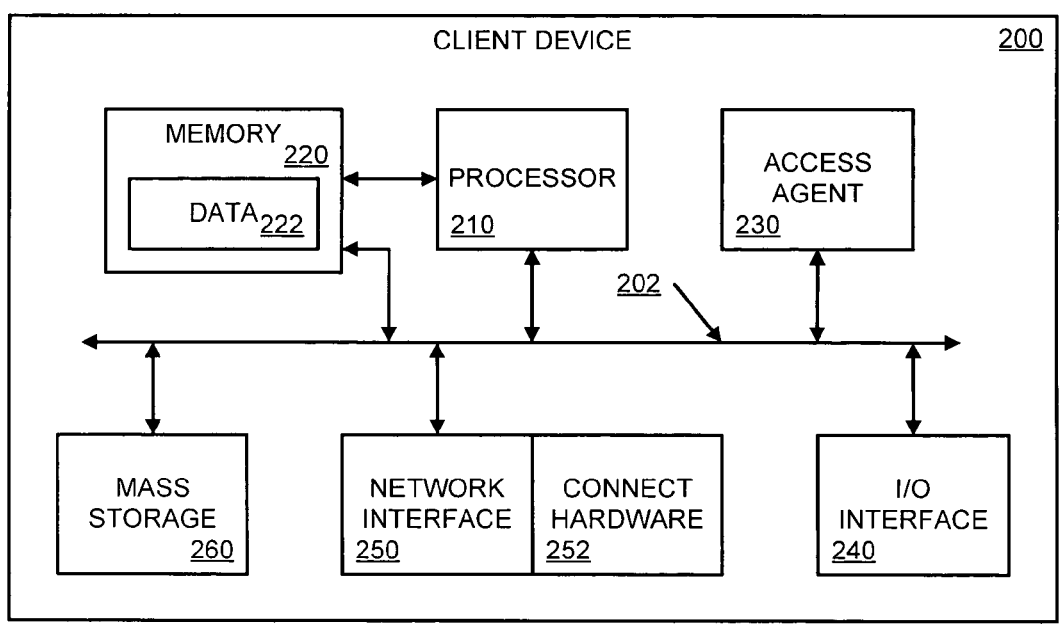
FIG. 2 is a block diagram of an embodiment of a client device with an access agent.

FIG. 2 is a block diagram of an embodiment of a client device with an access agent. Client device 200 represents an electronic system or computing system that may be one example of client device 100 above. For example, client device 200 can be a mobile computing device or mobile computing platform. Mobile computing devices may include laptop computers, handheld computing systems, personal digital assistants (PDAs), smart phones, etc. Client device 200 includes bus or bus system 202. Bus 202 is understood to be any number of lines, components, bridges, etc., to provide interconnectivity among multiple platform components. Bus 202 may include one or more multi-drop and/or single drop communication paths.

Processor 210 represents one or more computing elements of client device 200. Processor 210 can be any type of computing element, and may include one or more central processing units (CPUs), processing cores, digital signal processors (DSPs), programmable logic devices (PLDs), microcontrollers, etc., or some combination of these. Processor 210 generally provides computing resources to client device 200, and executes the main operations of client device 200. Client device 200 also includes memory 220, which may include one or more components of random access memory (RAM), including dynamic RAM (DRAM), synchronous DRAM (SDRAM), dual data rate RAM (DDR RAM), etc., or some combination of these. In general memory 220 provides temporary storage to provide instructions and data for processor 210 to compute/execute. Memory 220 can provide a resource into which to load programs to be executed on client device 200. Among other data or instructions stored in memory 220, memory 220 can include one or more applications and operating system (OS) 222. OS 222 is a main component of a software computing environment of client device 200. Other components of client device 200 are generally visible to and/or accessible to OS 222, and are referred to as in-band components of client device 200. Other components not visible or accessible to OS 222 may be referred to as OOB components.

Client device 200 also include one or more input/output (I/O) interfaces 240, which represent one or more components to provide interactivity with a user and/or interconnection with peripheral components and devices of client device 200. Client device 200 may include one or more network interfaces 250, which may be wired and/or wireless. In one embodiment client device 200 includes both wired and wireless interfaces, and one or both allow client device 200 to obtain wireless network configuration information from a network server. Connect hardware 252 of network interface 250 may provide components for a wired connection and/or a wireless connection. Network interface 250 represents both hardware components (e.g., interface circuits, interface ports, controllers) as well as software components to run the hardware components (e.g., drivers), for either or both of wired or wireless interfaces.

Client device 200 includes mass storage 260, which represents one or more components to store data and/or programs in a non-volatile manner. Non-volatile storage is storage that maintains its information even if power is removed to the storage device. Mass storage 160 may include one or more removable storage devices (e.g., optical/magnetic disk drives), non-volatile storage (e.g., flash or other semiconductor-based storage system, including universal serial bus (USB) storage compatibility), or magnetic hard disk drives (HDD), or some combination of these.

In one embodiment client device 200 includes access agent 230 to provide wireless connectivity to client device 200. For purposes of simplicity, access agent 230 as described herein could be considered to include one or more functional components of an iAMT platform, if applicable. Otherwise, access agent 230 can be considered to include all functionality within itself, including those functions that might otherwise be performed by another entity, such as an iAMT component. In general, as described above, access agent requests access to a network, and receives configuration parameters to implement to enable connectivity to the network. Once connectivity is established, access agent 230 can configure network interface 250 to allow network interface 250 to authenticate client device 200 to gain access to a wireless network. The procedure of authentication by network interface 250 can be any standard procedure known in the art. The ability of access agent 230 to obtain the wireless configuration parameters enables client device 200 to connect to and authenticate with a wireless network about which client device 200 potentially had no previous information.

Figure 3:
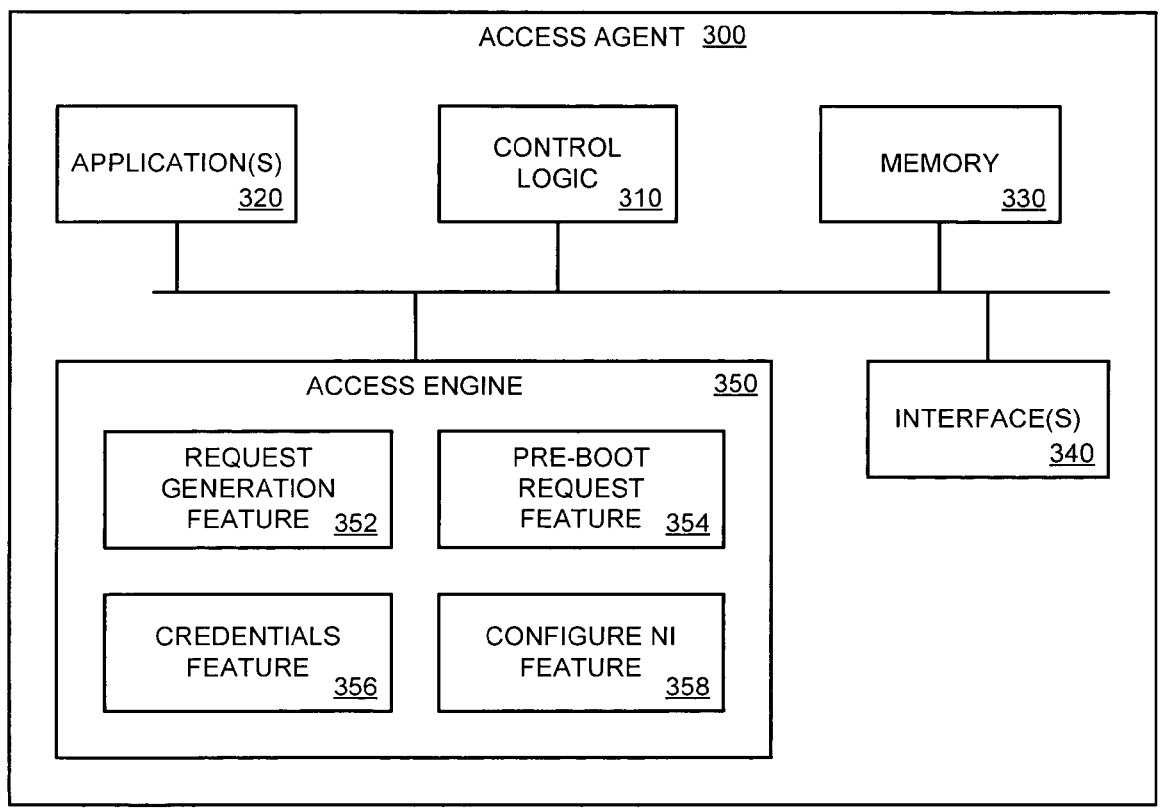
FIG. 3 is a block diagram of an embodiment of an access agent.

FIG. 3 is a block diagram of an embodiment of an access agent. Agent 300 includes control logic 310, which implements logical functional control to direct operation of agent 300, and/or hardware associated with directing operation of agent 300. In one embodiment agent 300 includes one or more applications 320, which represent code sequence and/or programs that provide instructions to control logic 310. Agent 300 includes memory 330 and/or access to memory resource 330 for storing data and/or instructions. Agent 300 also includes one or more interfaces 340, which represent access interfaces to/from agent 300 with regard to entities (electronic or human) external to agent 300. Interfaces 340 may include software and/or hardware interfaces, and may in one embodiment include application program interfaces (APIs) or other comparable software calls.

Agent 300 also includes access engine 350, which represents one or more functions that enable agent 300 to provide passing of access configuration parameters to a client. The functions include one or more of request generation feature 352, pre-boot request feature 354, credentials feature 356, and configure network interface 358. Other features may be included, making other versions of access engine 350 that are more or less complex than what is shown.

Generation feature 352 enables access engine 350 to generate access requests. The ability of access engine 350 to make access requests enables agent 300 to request and receive wireless configuration parameters. The requests may be EAP, as discussed above. Generation feature 352 enables access engine to interface with wired and/or wireless connection resources on a network interface to pass the request and receive the parameters.

Pre-boot request feature 354 enables access engine 350 to make requests prior to loading or the finishing of loading of a host operating system. In traditional systems the scanning and attempting to connect to wireless networks is associated with client software running on top of a computing environment. The computing environment includes a host operating system that is loaded to provide basic functions and basic interfaces to application software. With a pre-boot enabled agent, agent 300 may become active in a client device prior to the loading of the operating system. After agent 300 is active, pre-boot request feature 354 may enable agent 300 to generate requests for authentication and/or requests for wireless configuration parameters. Although requests can be made pre-boot, access engine 350 may, in one embodiment, monitor for wireless networks and attempt to connect when a network is detected, even prior to action by a user on a display of that network in client software.

Credentials feature 356 enables access engine 350 to obtain, store, and/or provide authentication credentials. As part of making the initial request that will enable agent 300 to obtain wireless configuration parameters, agent 300 may pass authentication credentials to an access server. The credentials passed to the access server can enable the access server to make a determination about whether to provide a wireless access point identifier to the client, what identifier to use, potentially a virtual local area connection (VLAN) assignment to pass to the client, etc. In one embodiment all of this can be performed prior to client software on the host client device attempting to connect to the wireless network, or prior to the client software being aware of the wireless network. The credentials may be the same credentials, or may include different credentials, as will be passed during standard authentication by the client software. Agent 300 could store the credentials, for example, in a secure location (e.g., a trusted platform module (TPM)).

Configure network interface (NI) 358 enables access engine 350 to pass received configuration parameters to client software, a driver, and/or otherwise provide configuration parameters to a network interface. Configure network interface 358 may include the ability to make function calls, API calls, etc. In one embodiment configuration information received from a wireless network is stored by agent 300. Storing can be made in a secure location out-of-band to the operating environment. In one embodiment configure network interface 358 includes a direct communication path to firmware on a network interface that allows agent 300 to pass parameters directly to the network interface.

Agent 300 may include hardware, software, and/or a combination of these. In a case where agent 300 includes software, the software data, instructions, and/or configuration may be provided via an article of manufacture by a machine/electronic device/hardware. Software to instruct a machine to implement the techniques herein, or software to use to manufacture a device to perform the techniques described herein may be provided via an article of manufacture by a machine/electronic device/hardware. An article of manufacture may include a machine accessible/readable medium having content to provide instructions, data, etc. The content may result in an electronic device or computing system performing various operations or executions described. A machine accessible medium includes any mechanism that provides (i.e., stores and/or transmits) information/content/instructions in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.). The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download (i.e., providing the code for access) over a communication medium may be understood as providing an article of manufacture with such content described above.

Figure 4:
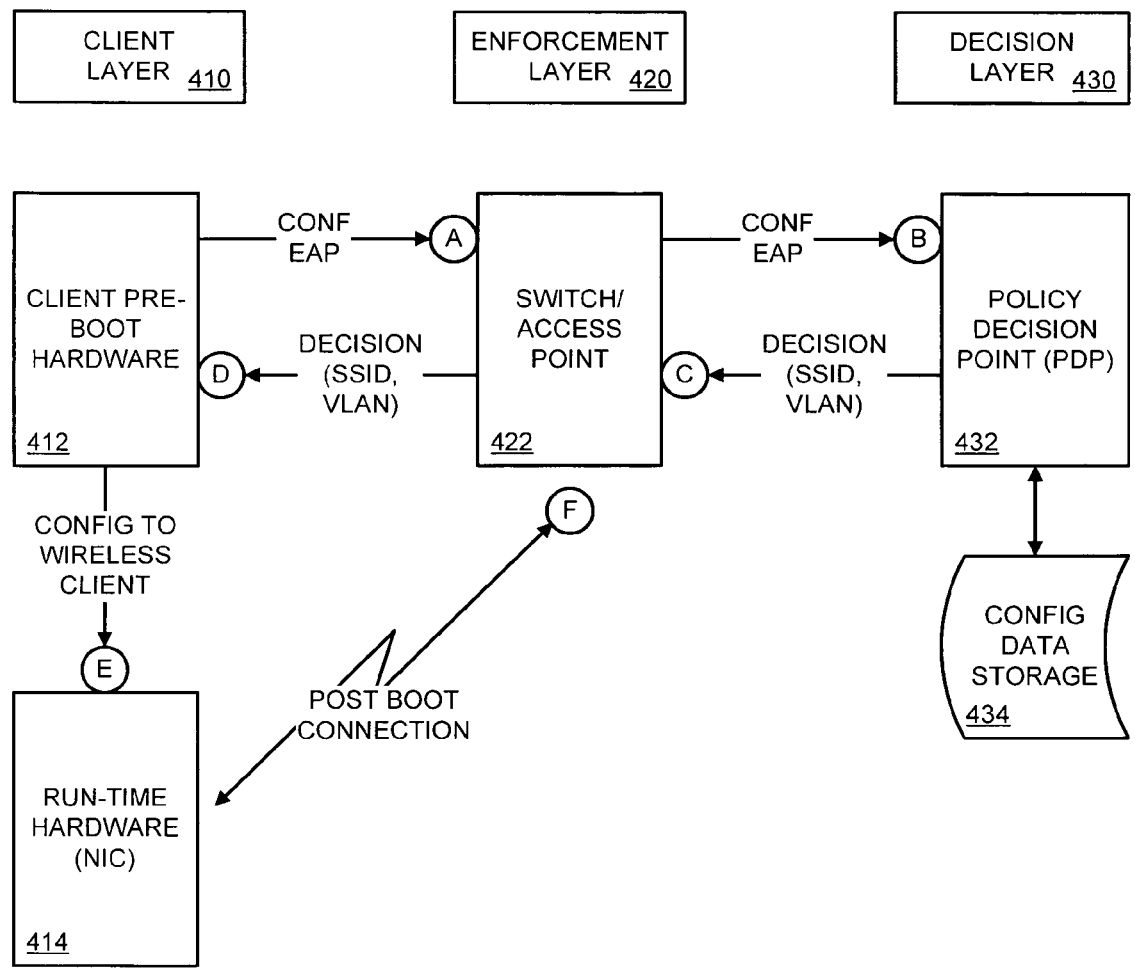
FIG. 4 is a block diagram of an embodiment of a client device interacting with an enforcement device and a decision point.

FIG. 4 is a block diagram of an embodiment of a client device interacting with an enforcement device and a decision point. A client device can send an authentication or access request to a network access switch/point, which in turn may interact with an access server to determine whether and what configuration to return to the client. Client layer 410 represents the processes/operations and data occurring at the client device in the configuration information exchange. Enforcement layer 420 represents the processes/operations occurring at the access point. Decision layer 430 represents the processes/operations occurring at the access server, or decision point.

A client may include pre-boot hardware 412 that provides or includes an access agent. The agent may transmit a request, represented as an EAP configuration request shown in FIG. 4 at point A. The request may be made prior to booting up of the client's host operating system. The client device may include a firmware stack executing EAP on top of a simple network protocol (SNP) and universal network data interface (UNDI), or a hardware management agent with a network stack. The network transaction arrives to switch/access point 422 at A. Switch/access point 422 converts the network transaction from an EAP layer 2 message to a layer 3 RADIUS message, which is forwarded to policy decision point PDP 432 at B.

PDP 432 in one embodiment stores configuration data in configuration data storage 434. PDP can check a network policy (e.g., corporate IT (information technology) policy), and will either enroll the client (e.g., getting started) or authenticate the enrolled client. Enrolling the client allows the client to complete authentication through the use of client software. When enrolling the client, PDP 432 can return the wireless credentials to the client to enable the client to attempt to authenticate over the wireless network. The decision is sent from PDP 432 to switch/access point 422 at C. The decision may include one or more of an SSID or a VLAN assignment. The decision is passed back to client pre-boot hardware 412 from switch/access point 422 at D. Client pre-boot hardware 412 can store the information, for example, in a protected store, in flash with security management protection (e.g., not visible to the operating system and accessible in a service mode), or in a visible flash after sealing information against the environment with a TPM.

Client pre-boot hardware 412 can forward the information to run-time hardware 414 (e.g., a network interface card (NIC)) at E. Passing the information may include implementing the configuration settings provided in the decision. A post-boot connection is shown at F, as the client can connect to switch/access point 422 through run-time hardware 414 to finish the configuration and gain access to the network.

Figure 5:
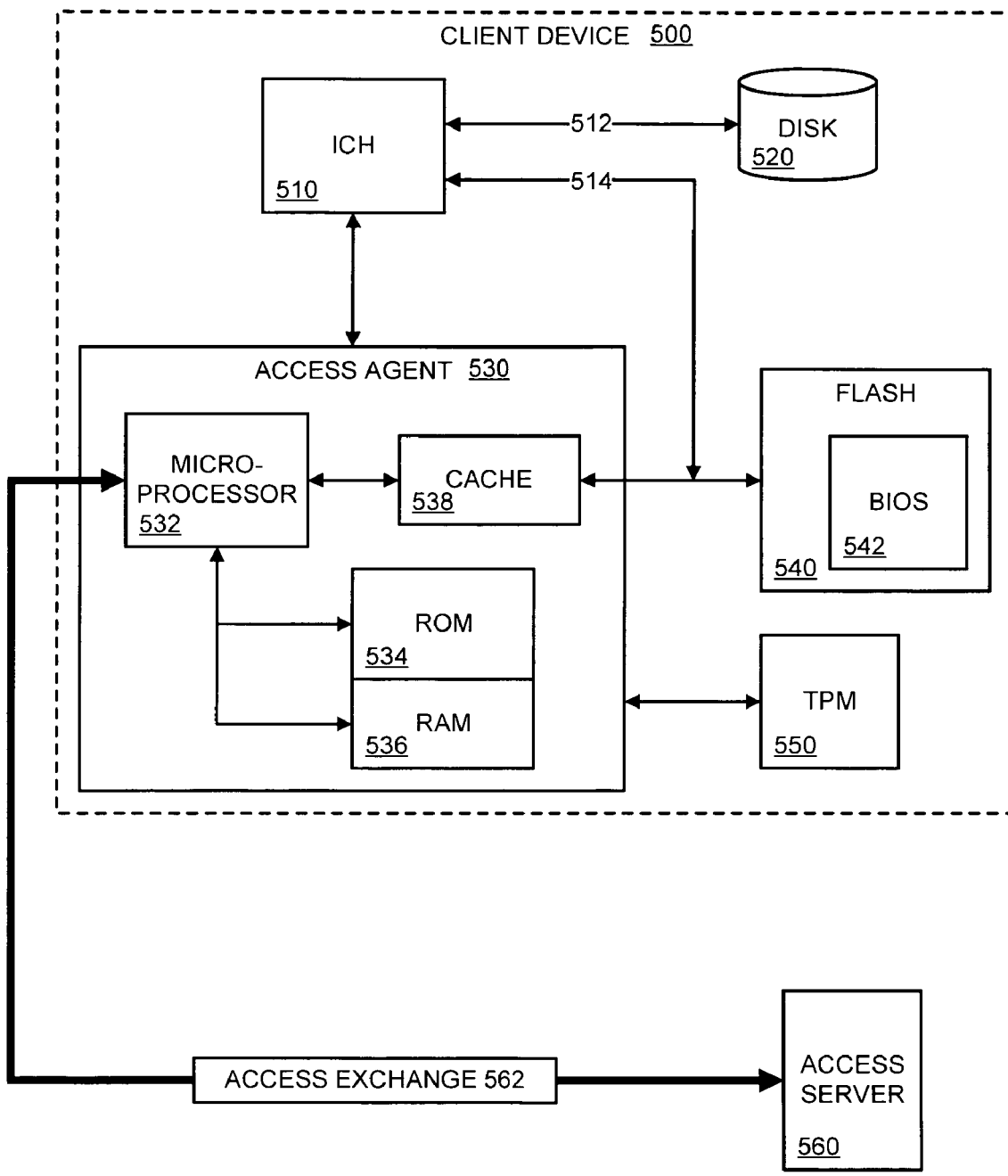
FIG. 5 is a block diagram of an embodiment of a client device with an access agent coupled with an access server.

FIG. 5 is a block diagram of an embodiment of a client device with an access agent coupled with an access server. Client device 500 may represent an example of a client device according to any client device previously mentioned. The specifics of an implementation according to FIG. 5 are merely illustrative, and should not be considered to be limiting. In one embodiment client device 500 represents a class of computing devices operating on an x86 platform. Client device 500 may include ICH (input/output (I/O) controller hub) 510, which may be coupled with and provide control/management of I/O functions. For example, ICH 510 can be connected to disk 520 over interface 512. Interface 512 could be an IDE (interactive development environment) interface for connecting to disk drives.

Access agent 530 can also be connected to ICH 510. Access agent 530 may represent one example of an access agent according to any access agent described above. Access agent 530 is shown as including microprocessor 532, which represents any processor or microcontroller that may execute the operations of access agent 530. Microprocessor 532 may be coupled to memory, shown by read-only memory (ROM) 534 and random access memory (RAM) 536. The memory may provide instructions to microprocessor 532 and/or store data. Microprocessor 532 can be coupled to flash 540 through cache memory 538. Interface 514 may be a serial peripheral interface (SPI), which couples ICH 510 and cache 538 to flash 540. Flash 540 may include basic I/O system (BIOS) 542. In one embodiment access agent 530 is also coupled to TPM 550 to securely store information.

Access agent 530 may be coupled to access server 560 over an interface to provide access exchange 562. The interface may be wired or wireless, pre-boot or post-boot, and may be an implementation of the connections described above. One possible implementation of access exchange 562 is described in greater detail below. In general, access exchange 562 enables access agent 562 to obtain configuration information to provide dynamic wireless configuration to client device 500.

Figure 6:
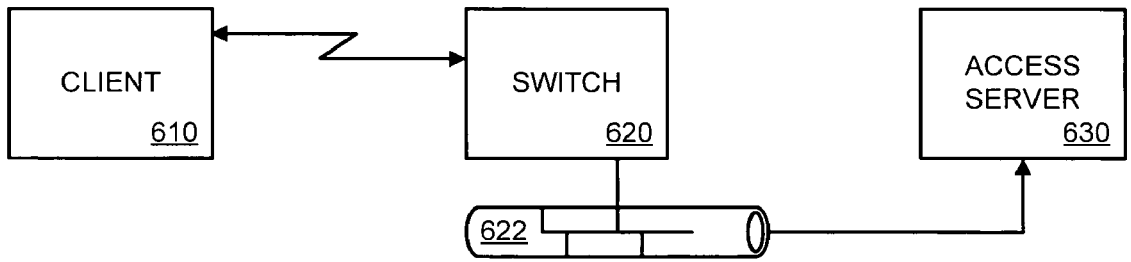
FIG. 6 is a flow diagram of an embodiment of an access request exchange.
Figure 6:
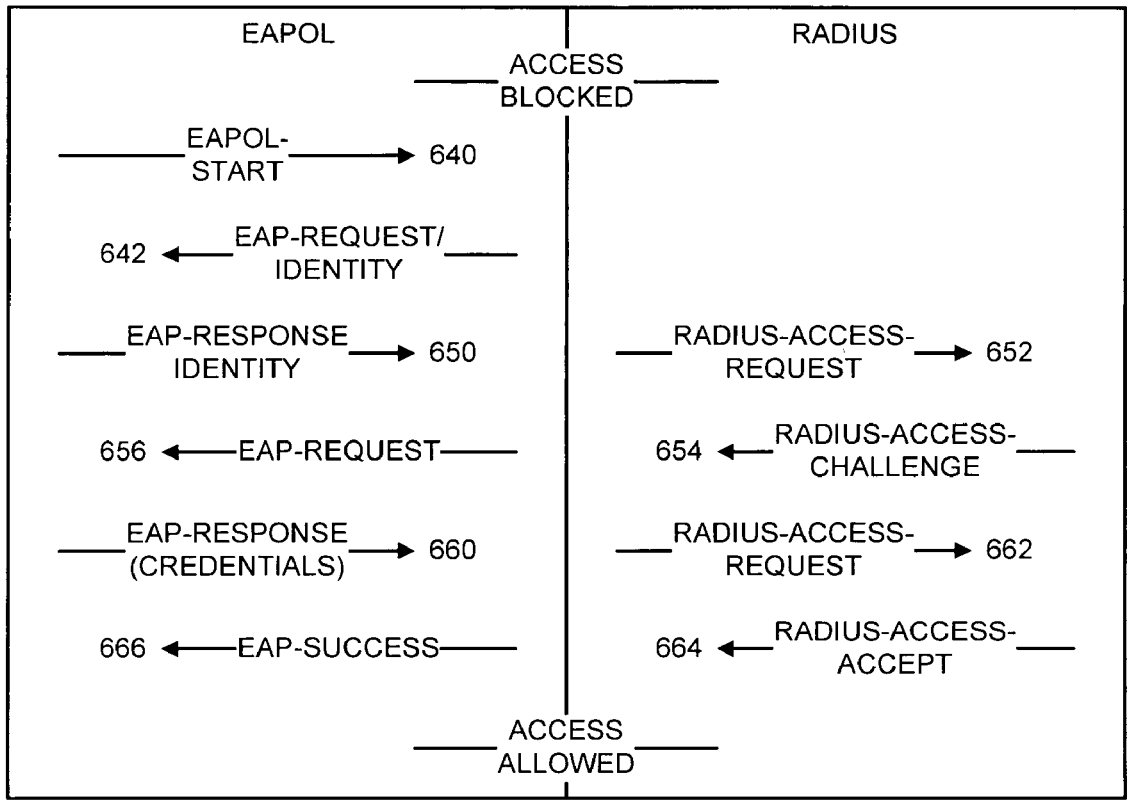

FIG. 6 is a flow diagram of an embodiment of an access request exchange. A generic view of a system that may implement the method is shown, with client 610 communicatively coupled with switch 620, coupled with communication interface 622, coupled with access server 630. Client 610 may be any type of client or client device discussed previously. Switch 620 may be any type of access point discussed previously. Communication interface 622 in one embodiment is an Ethernet connection to access server 630.

The access request exchange depicted is one example of a possible access exchange according to access exchange 562 of FIG. 5. The process depicted is to be understood as general, and may be different if different protocols are used, or in other implementations. The communication between client 610 and switch 620 is shown as being EAPOL (EAP over LAN), and the communication between switch 620 and access server 630 is shown as being RADIUS.

At first all access to/from the network by client 610 may be blocked. Client 610 can send EAPOL-start 640 to initiate communication with access server 630 and request access. Switch 620 may issue EAP identity request 642 in response to the access request. In response to EAP identity request 642, client 610 may present its identity with EAP identity response 650. Switch 620 converts EAP identity response 650 into RADIUS access request message 652, which is transmitted to access server 630. Access server 630 responds to RADIUS access request 652 with RADIUS access challenge 654, which server 620 converts to EAP request 656.

Client 610 processes the challenge and provides EAP response 660, which includes the result of processing the challenge. Switch 620 converts EAP response 660 into RADIUS access request 662 and forwards the request to access server 630. Access server 630 returns the decision, which is shown as RADIUS access accept 664. If client 610 were refused access, message 664 would be different than what is shown. RADIUS access accept 664 may include configuration parameters that client 610 will employ to connect to the network. Switch 620 converts the acceptance message into EAP success 666, after which access can be allowed by client 610 to the wireless network.

Figure 7:
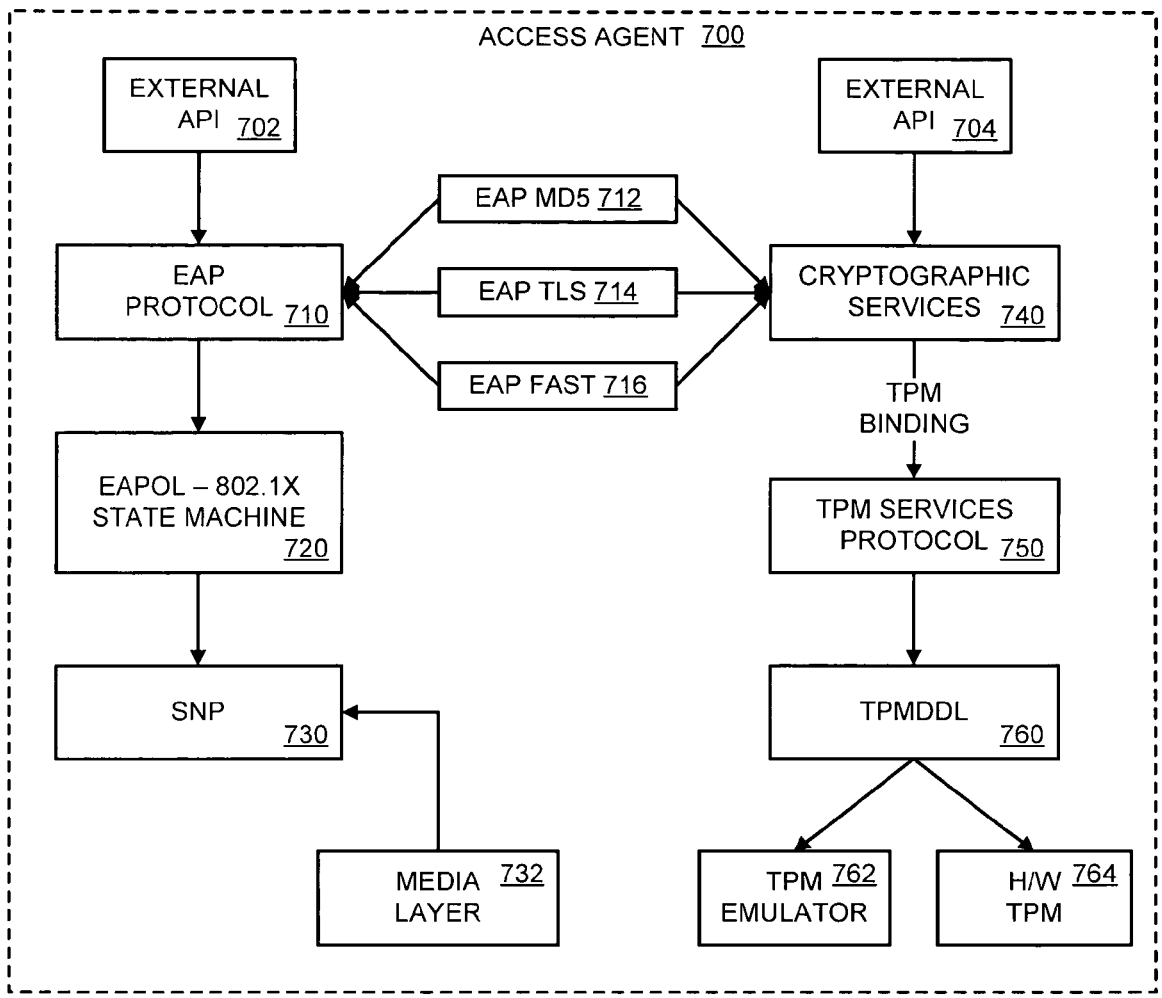
FIG. 7 is a block diagram of an embodiment of software layering of an access agent.

FIG. 7 is a block diagram of an embodiment of software layering of an access agent. Access agent 700 represents one embodiment of an access agent as previously described. The software layering may be as follows. External API 702 can be generated from outside the software stack shown. Similarly, external API 704 can be generated from outside the context of the TPM layers shown. EAP protocol 710 may receive external API 702. EAP protocol 710 may determine an EAP method to employ, for example, from among EAP MD5 712, EAP TLS 714, and EAP FAST 716. Through one or more of these methods, EAP protocol 710 may obtain cryptographic services 740, which may prepare a message for transmission. EAP protocol 710 can provide a prepared message to EAPOL state machine 720. EAPOL state machine 720 can provide a mechanism for access agent 700 to format the message for communication over a communication medium. EAPOL state machine 720 may feed SNP 730, which may also receive input from media layer 732, for example, specific configuration details. The configuration details may be provided from an access server to specify how a client is to connect to a wireless network.

Cryptographic services 740 may also provide a mechanism for securely storing configuration data. Cryptographic services 740 may provide information through a TPM binding according to TPM services protocol 750, which in turn passes information to TPM device driver layer (TPMDDL) 760. The TPM device driver provides access to the TPM. TPMDDL 760 may provide access to TPM emulator 762, which provides a software implementation of a secure storage mechanism, or to hardware TPM 764. TPM 764 may provide a "Seal" operation to ensure that only authorized software drivers can access the credentials for an EAP authentication mechanism, such as a pre-shared key for EAP-MD5 712, or a public key for EAP-TLS 714.

Figure 8:
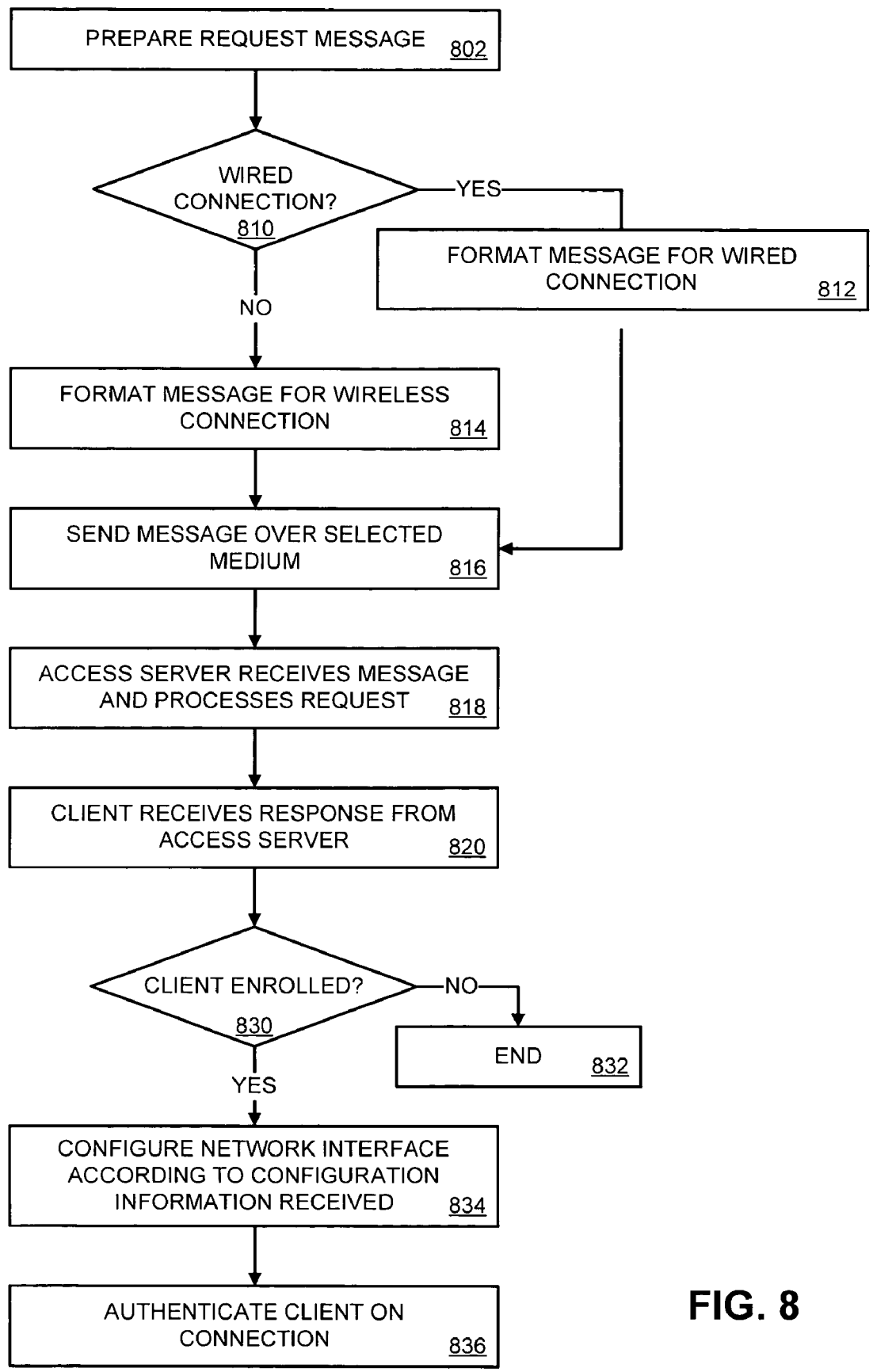
FIG. 8 is a flow diagram of an embodiment of providing a client device with configuration parameters for connecting to a wireless network.

FIG. 8 is a flow diagram of an embodiment of providing a client device with configuration parameters for connecting to a wireless network. A client prepares a request message, 802. The client may prepare the message with an access agent, as previously described, which enables the client to request and receive wireless configuration information. Preparing the message can be performed pre-boot. In one embodiment the entire process depicted in FIG. 8 can occur prior to, or concurrently with, boot-up of a host operating system. The client may determine if a wired or wireless connection will be tried to transmit the message, 810. In one embodiment a client may default to a wired connection to obtain wireless configuration information, and then authenticate wirelessly with the settings obtained. In another embodiment the client connects to an access point (e.g., on a control link) wirelessly and obtains information about the wireless network configuration that enable the client to autonomously (i.e., without human intervention) establish the wireless link with an appropriate wireless access point to connect to the network.

If a wired connection is used, the request message is formatted for the wired connection, 812. If a wireless connection is used, the request message is formatted for the wireless connection, 814. In either case, the message is sent over the selected medium, 816, intended for the access server to render a decision as to the ability of the client to connect to the wireless network. The access server in turn receives the message and processes the request, 818. This may involve the switching of the message through a wireless access point that converts the message into a format suitable for the access server to process. The access server can then store the identification information of the client and make a decision as to whether the client will be allowed to connect, and if so, what access point will be used and potentially what VLAN. For example, an access server may determine to quarantine the client in a protected network segment and/or restrict the access privileges given to the client. The access server then returns the decision to the client, which receives the response, 820. If the client is to be given permission to connect to the network to attempt to authenticate, also referred to as being "enrolled," the access server may include configuration information for the client to use to configure its wireless interface(s).

The server may then determine, for example with an access agent, whether the client has been enrolled, based on the response, 830. If the client is not enrolled, the access server has determined that the client is not to have access to the network, and the process is over, 832. If the client is enrolled, the client can configure its wireless network interface according to the configuration information received from the access server, 834. The client can then authenticate and complete configuration to obtain access to the wireless network for data traffic, 836.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   sending a layer-2 access request from a client to an access server of a closed wireless network that does not broadcast wireless access point service set identifiers (SSIDs), the request sent prior to completion of a boot process of a client device, the client lacking configuration information to enable accessing the wireless network through a wireless access point of the wireless network, wherein the sending is performed by an agent on the client device via an Ethernet port over a wired connection with the access server, the agent having a processor and memory inaccessible to a host operating system of the client, the agent operating outside the context of the host operating system of the client, and wherein the layer-2 access request is a layer-2 authentication request that is compatible with the extensible authentication protocol (EAP);
   receiving at the client over the wired connection from the access server wireless configuration parameters including a wireless access point SSID; and
   configuring a wireless interface of the client with the received wireless configuration parameters to connect to the wireless access point to enable obtaining access to the wireless network.

2. A method according to claim 1, wherein sending the access request comprises sending the access request over a wired connection to the access server.

3. A method according to claim 1, wherein sending the access request comprises transmitting the access request wirelessly.

4. A method according to claim 1, further comprising:
   storing the configuration parameters in a secure storage outside the context of a host operating system of the client.

5. A method according to claim 1, wherein receiving the wireless configuration parameters comprises receiving one of multiple dynamically generated service set identifiers (SSIDs).

6. A method according to claim 5, wherein receiving the dynamically generated SSID comprises receiving an individualized SSID that functions for access only to the requesting client.

7. A method according to claim 1, wherein the wireless configuration parameters further include a virtual local area network (VLAN) assignment.

8. A method according to claim 7, wherein the VLAN assignment comprising a quarantine VLAN.

9. A method according to claim 1, wherein sending the access request further comprises sending a one-time-use password to indicate the client device lacks the configuration information.

10. An article of manufacture comprising a machine-accessible storage medium having content stored thereon to provide instructions, which when executed result in a machine performing operations including:
    sending a layer-2 access request for access to an access server of a closed wireless network that does not broadcast wireless access point service set identifiers (SSIDs), the request sent prior to completion of a boot process of a client device, the client lacking configuration information to enable accessing the wireless network through a wireless access point of the wireless network, wherein the sending is performed by an agent on the client device via an Ethernet port over a wired connection with the access server, the agent having a processor and memory inaccessible to a host operating system of the client, the agent operating outside the context of the host operating system of the client, and wherein the layer-2 access request is a layer-2 authentication request that is compatible with the extensible authentication protocol (EAP);
    receiving wireless configuration information over the wired connection in response to the request, the wireless configuration information including a wireless access point SSID; and
    configuring a wireless interface according to the received wireless configuration information to connect to the identified wireless access point to engage in authentication to access the wireless network.

11. An article of manufacture according to claim 10, the wireless configuration information further including a virtual local area network (VLAN) assignment.

12. An article of manufacture according to claim 11, wherein the VLAN assignment comprising a quarantine VLAN.

13. An article of manufacture according to claim 10, wherein sending the access request comprises sending the access request over a wired connection to the access server.

14. An article of manufacture according to claim 10, wherein receiving the wireless configuration parameters comprises receiving one of multiple dynamically generated service set identifiers (SSIDs).

15. An article of manufacture according to claim 14, wherein receiving the dynamically generated SSID comprises receiving an individualized SSID that functions for access only to the requesting client.

16. An article of manufacture according to claim 10, wherein sending the access request further comprises sending a one-time-use password to indicate the client device lacks the configuration information.

17. A system comprising:
 a wireless interface to communicate with a wireless access point of a wireless network, the wireless network being a closed wireless network that does not broadcast wireless access point service set identifiers (SSIDs);
 an Ethernet port having a wired connection to an access server of the wireless network;
 a memory having instructions stored thereon to define operations including sending a layer-2 access request to the access server over the wired connection to request access to the wireless network, where the layer-2 access request is a layer-2 authentication request sent prior to completion of a boot process of the system, the request compatible with the extensible authentication protocol (EAP), receiving in response to the request wireless configuration parameters including a wireless access point SSID to enable wireless connectivity to the wireless access point, and passing the wireless configuration parameters to the wireless interface to result in the wireless interface employing the configuration parameters to communicate with the wireless access point; and
 a processor, coupled with the memory to execute the instructions;
 wherein the processor and the memory are part of an agent on the system that is inaccessible to a main operating system of the system.

* * * * *